United States Patent Office 3,531,368
Patented Sept. 29, 1970

3,531,368
SYNTHETIC FILAMENTS AND THE LIKE
Miyoshi Okamoto, Ohtsu-shi, Koji Watanabe, Sonoyama, Yasuhiko Nukushina, Kyoto, and Tsuneo Aizawa, Ohtsu-shi, Japan, assignors to Toyo Rayon Kabushiki Kaisha, Tokyo, Japan, a corporation of Japan
Filed Jan. 4, 1967, Ser. No. 607,302
Claims priority, application Japan, Jan. 7, 1966, 41/560; Nov. 18, 1966, 41/75,446
Int. Cl. D01d 7/04; D02g 3/04
U.S. Cl. 161—175                                    11 Claims

ABSTRACT OF THE DISCLOSURE

New synthetic filament consisting of an assembly of a plurality of extremely fine filament parts being closely in contact with one another without gap, the filament part having at least two polymer elements of a different composition, and each element of the same polymer being continuous along the fiber axis, and also method and apparatus of the manufacture of the above-mentioned filament.

---

This invention concerns a synthetic filament and the like having a novel structure, a method of its manufacture and an apparatus for the manufacture of such filament.

Many polymers have been known up to date. Some of them have been made into synthetic filaments by spinning, and are used widely and advantageously both at home and in the field of industry. In spite of the many merits of these conventional synthetic filaments, however, they also have defects, and are limited in their use. This is derived from the limitation on the properties inherent in the polymers that make up the synthetic filament.

In the field of synthetic filaments, requests have been made to improve the filaments from polymers when the Young's modulus is low, dyeability is inferior, dyeing fastness is inferior, shrinkage is high or low, dimensional stability is inferior, wool-like filaments are desired, the feel of the surface of filaments is bad, the filaments cannot be made into fibrils even if so desired, the properties are changeable by heat, adhesion with rubber is inferior, the fibers cannot be made very fine, the increase of crimp stability is desired, resistance to flexing is desired to be changed either way, the change in the density of filaments is desired, the decrease of the dimensional stability and flat spot of the tire cord made from such filaments is desired, change in the characteristic of guts is desired, the change of the tone of a chord of a guitar, for instance, is desired, the electrostatic properties of filaments, elongation or elasticity is desired to be changed, and in many other possible instances.

In order to meet such a host of requirements, various attempts have been made. One of the methods would be to discover a new polymer and put it on a commercial basis. Recent trends indicate however that such a way is very difficult to realize. Another method is to make a polymer blend. Because polymers have a high viscosity and molecular weight, it is difficult to mix them with ease, and they must be mixed rapidly so that there may occur no decomposition or interreaction. If the time needed for mixing is too long, the polymers often change in quality. If too many polymers are mixed with one another, the merits of each polymer are prone to be lost. Even when it is desired to utilize the interreaction of these polymers, the reaction does not stop in a state of block formation, but tends to go as far as to a random state. Furthermore, filaments obtained from a polymer blend do not have a structure wherein the dispersed polymers are continuous along the fiber axis (see FIG. 4), and for this reason, the properties such as tenacity of each polymer cannot be fully utilized to advantage.

Another method of meeting the aforementioned need is to make a composite filament. The composite filaments known heretofore are particularly advantageous in producing crimped yarns, and such filaments are actually commercialised in many countries of the world. These filaments are effective in such a particular field of use, but are not satisfactory enough to impart the various properties required of synthetic filaments.

An object of this invention is to provide a novel synthetic filament and the like capable of exhibiting the characteristics of at least two polymers advantageously and satisfying our want and the above-mentioned needs of the industry.

This new synthetic filament advantageously exhibits the properties of at least two polymers. Filaments generally undergo repeating bending stress. But even in such a case, the synthetic material according to this invention undergoes the stress uniformly, and the stress by flexing is hard to concentrate on certain points. It also shows a very stable behaviour in the drawing and wind-up operations. Thus, the synthetic filament behaves as if it were made from one new polymer rather than at least two polymers. Furthermore, the synthetic filament of this invention has very excellent performance in dimensional stability which is one of the important factors of estimating filaments. The desired Young's modulus according to use can be very easily imparted. When the synthetic filament of this invention is used as a tire cord, the flat spot is greatly improved. Dyeability is another important factor of synthetic filaments, but the filament of this invention can be very uniformly dyed. Also it is possible to process the filament of this invention into a delustered filament.

The synthetic filament having such properties comprises one filament wherein many very fine parts are assembled closely to each other without gaps. By looking at the synthetic filament of this invention from a different angle, its characteristic of the structure will be able to be grasped more clearly. Namely, the cross-sectional view of the structure reveals that many islands of one polymer are dotted closely in a sea formed of another polymer or groups of a plurality of islands in contact with each other are scattered here and there. The longitudinal section indicates that the polymers which make up the said sea and islands are continuous in the lengthwise direction without interruption.

The polymers used in accordance with this invention may be any polymer having a fiber-forming ability. For instance, the previously well-known polymers of the polyamide, polyester, polyacryl, polyurethane and polyolefin series are as useable polymers. According to this invention, usually a combination of polymers of different series, such as polyamide with polyester, polyamide with polyolefin, and polyester with polyolefin is advantageously used. As a matter of course, combinations of homopolyamide with copolyamide, different copolyamides with each other, homopolyester with copolyester, different copolyesters with each other, and polymers with each other of quite the same chemical composition but having different degree of polymerization can be used. The choice of polymer combination is often of importance, and preferable is a combination wherein the defects of the polymers are mutually offset. When a combination of polyamide and polyester is used, the low Young's modulus of the polyamide is offset by the polyester which has a higher Young's modulus so that the Young's modulus may become uniform throughout the composite filament, and the bad dyeability of the polyester is made up for by excellent dyeability of the polyamide. In the filament of this invention composed of very fine parts consisting of polyamide and polyester as units, the offsetting of the defects of both polymers is homogeneous throughout the filament. Thus, this filament is free of the various defects of the conventional composite filaments or yarns obtained by the polymer blending process. A usually used additive such as heat-stabiliser, light-stabiliser, anti-colouring agent, antistatic agent and delusterant may be incorporated into the polymers used in this invention. In order for the synthetic filament and the like of this invention to exhibit the advantages very remarkably, it is preferable that the number of very fine parts that make up the filament should be 10 or more.

The synthetic filament of this invention is obtained by discharging a fluid of at least two polymers so as to make them adjoin each other in continuation along the lengthwise direction, assembling the discharged fluids together in a continuously and intimately adjoining fashion, and spinning this assembly through one spinning orifice. According to this method, at least two polymers are guided to the spinning orifice in a layer flow, and this is one of the characteristic features of the method of this invention. According to the method of this invention, the synthetic filament having such a complicated structure can be easily manufactured commercially, and a synthetic filament of considerably small denier can also be obtained. The spun filaments are improved in tenacity by the use of the previously known drawing method to make them into feasible filaments.

Melt-spinning, wet-spinning and dry-spinning methods are all used in this invention, but melt-spinning is particularly preferred. A greater improvement can be expected by using the method of this invention in conjunction with the conventional improved method wherein spinning conditions for the improvement of filaments are used. For instance, various non-circular orifices known heretofore can be used. Furthermore, the filaments of this invention can be subjected to various treatments after the step of spinning which have been heretofore proposed for the improvement of filaments. For instance, the filaments can be crimped by means of a stuffing box, or they can be cut into staple fibers of appropriate lengths. Also, if the intended polymer alone is left in the said synthetic filament and other polymers are removed by a special treatment, it is possible to obtain filaments with a very fine denier. One can thus very easily obtain monofilaments with a denier of less than 0.1. The superiority of such fine denier filament has been hypothesized from long ago, but there has been established no commercial process for manufacturing such a filament. Furthermore, articles composed of very fine filaments can be obtained by interlacing the synthetic filaments after knitting and looming treatment or without such treatment and then removing the polymers, leaving only the intended polymer. The microfilaments obtained are continuous along the desired length, and are very advantageous in that they are continuous in the longitudinal direction along the desired length, as compared with the filaments obtained by centrifugal spinning or by jet spinning which have hitherto been used to manufacture very fine filaments. A specific means for removing the polymers other than the intended one is to immerse the fibrous materials in a solvent which dissolves only the polymers to be removed or to melt or decompose only the polymers to be removed.

It is preferred that the method of manufacture according to this invention be practised by means of the apparatus which comprises a plurality of discharging means for discharging at least two polymers simultaneously or independently, a space communicating with the said discharging means and adapted to receive the polymer fluids discharged from the said discharging means as a layer flow, and a spinning means communicating at one end with the said space and having orifices at the other end.

In the following, the invention will be explained with reference to the accompanying drawings in which.

Figure 1:
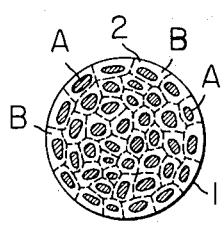
FIG. 1 is a cross-sectional view showing one example of the synthetic filament according to this invention.

The structure of the synthetic filament of this invention will now be explained with reference to FIGS. 1 and 3. The synthetic filament 1 is composed of two polymers A and B. It is constructed of many units of a very fine part 2 consisting of A covered by B. With respect to the cross-section, if the portion B is considered to be the sea, the construction of this synthetic material is such that many islands of element A are uniformly dotted in the sea. In the longitudinal section, both elements A and B are continuous without interruption along the length of the synthetic filament 1. The dotted line drawn in FIG. 1 is an imaginary line for the facilitation of understanding.

Figure 2:
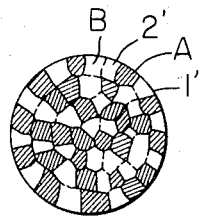
FIG. 2 is a cross-sectional view showing another example of the synthetic filament according to this invention.

In FIG. 2, the synthetic filament 1' is composed of two polymers A and B. It is constructed of many units of a very uniformly distributed throughout. With respect to the cross-section, if the portion B is considered to be the sea, the construction of this synthetic filament is such that many islands of element A are uniformly distributed in groups of a plurality of islands being in close contact with one another. In the longitudinal section, both elements A and B are continuous without interruption along the length of the synthetic filament 1', just as in FIG. 3.

With a view to making clearer the characteristic features of the synthetic filament of this invention, the structure of the filament obtained by the afore-mentioned polymer blending process and that of the synthetic filament of this invention will be compared with reference to the drawings. The difference can be known detailedly by a microscopic observation, and this difference is great evidence of the advantageous properties of the synthetic filament according to this invention. The difference can be clarified particularly by comparing the longitudinal sections of both filaments. The longitudinal section of the filament obtained by the polymer blending method is shown in FIG. 4. It is clear from FIG. 4 taken in conjunction with FIG. 3 that the element A distributed in element B is intermittently cut along the length of filament 3. This will substantiate the fact that both filaments are different from each oher not only in mechanical properties but also in dyeability, and the structure of the synthetic filament of this invention is quite preferable.

Figure 5:
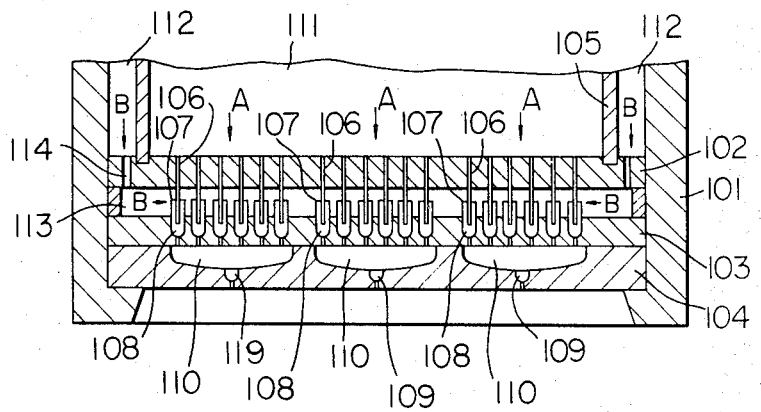
FIG. 5 is a longitudinal sectional view of one embodiment of the apparatus of this invention for manufacturing the synthetic filament.

In FIG. 5, the reference numeral 101 shows a pack case having therein a composite polymer stream discharge device constructed of two discharge plates 102 and 103, and a spinneret plate 104 held tight on the under face of the said discharge device. The upper part of the said discharge device is partitioned into two chambers 111 and 112 by a partition plate 105 so that polymers A and B may be fed respectively into chambers 111 and 112 without being mixed with each other. A space 113 is defined between the plates 102 and 103, and communicates with the chamber 112. Polymer B is fed into the space 113 by means of a path 114. The composite polymer stream discharge device is a sheath-and-core type discharge device by which a composite consisting of polymer A as a core and polymer B as a sheath is discharged. In this device, the tip portion of a narrow tube 106 fitted to the discharge plate 102 in perforation therethrough is inserted in the center of a conduit 107 fitted into a discharge orifice 108 of the discharge plate 103. Accordingly, polymer A fed through the narrow tube 106 is covered by polymer B supplied through the conduit 177 opening to the space 113, and is discharged downwardly through the discharge orifice 108. The flow-in side of a spinning orifice 109 of the spinneret plate 104 is enlarged upwardly to a greater degree, and forms a space or cell 110. This cell 110 opposes at least three discharge orifices 108 provided in the discharge plate 103. In order for the synthetic filament of this invention to exhibit its characteristics, it is preferable that one cell, that is one spinning orifice, face 3 to 10,000 discharge orifices 108. Particularly preferably, it should face 10 or more discharge orifices.

Figure 6:
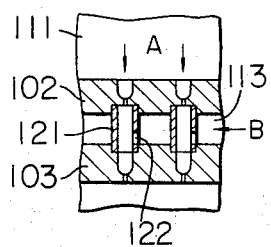
FIGS. 6 and 7 are sectional views showing other embodiments of the discharge device shown in FIG. 5.
Figure 7:
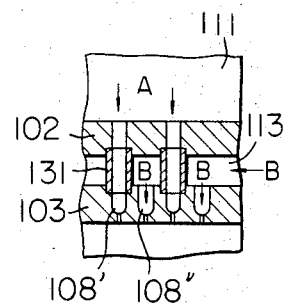

The discharge device at the rear of the spinneret may be a side-by-side type discharge device shown in FIG. 6 or an independent type discharge device shown in FIG. 7 in addition to the said sheath-and-core type discharge device. In the discharge device shown in FIG. 6, the discharging orifices of the upper and lower discharge plates 102 and 103 are connected to each other by means of a tube 121, and an opening 122 is provided on the side of this tube 121. Thus, polymer B comes from the space 113 into the opening 122 on the side of the tube 121 where polymer A passes through, and these two polymers are discharged through the discharge orifices in a side-by-side fashion. Another type of side-by-side discharging device may be usable if it is capable of discharging the polymers in a side-by-side fashion. In the construction of the discharge device shown in FIG. 7, some of the discharge orifices of the discharge plate 103 in the lower part are connected with the discharge orifices of the discharge plate 102 at the upper part and are opened into the chamber 111, other discharge orifices being opened into the space 113. Accordingly, polymer A alone is discharged from the orifice 108' and polymer B alone, from the orifice 108", independently. In the case of using these types of discharging devices, it is also preferable that at least 3, preferably 10 or more, orifices of the lower part discharge plate should face each spinning orifice on the spinneret plate.

When the polymers having different properties are spun by means of the spinning apparatus shown in FIG. 5, a continuous polymer stream wherein polymer A is covered by polymer B is discharged from the discharge orifice 108 by the sheath-and-core type discharge device constructed of discharge plates 102 and 103. A number of these polymers streams are associated in one cell 110 and are spun into one filament through the spinning orifice 109 of the spinneret plate 104. The cross-section of the filament so obtained indicates that the filament is composed of many units of a very fine part of polymer A covered by polymer B, which are very uniformly distributed. In this figure, the dotted line drawn on the element B is an imaginary line. The cell 110 in the above apparatus is absolutely necessary to distribute and disperse the desired number of very fine sheath-and-core polymer streams within this one filament.

Figure 3:
FIG. 3 is a schematic view showing the longitudinal section of the synthetic filaments shown in FIGS. 1 and 2.
Figure 4:
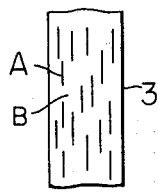
FIG. 4 is a longitudinal sectional view of the filament obtained by the conventional polymer blend process.

In FIG. 3, the polymers A and B in the very fine fibers are arranged continuously along the fiber axis without interruption. This clearly distinguishes the synthetic filament of this invention from the filament obtained by the polymer blending process. In the filament obtained by the polymer blending process, the polymers are not continuous in the longitudinal section but are interrupted here and there.

The filament cross-section shown in FIG. 2 is the cross-section of the filament obtained by using the side-by-side type discharging device of FIG. 6 in the spinning apparatus shown in FIG. 5. Similarly to the case of using the shearth-and-core type device, exceedingly fine streams of each element are very uniformly distributed and dispersed. Namely, in this case, fine discharged streams of side-by-side type are associated into one filament. When the independent discharging device shown in FIG. 7 is used, it is also possible to prepare a filament composed of polymers arranged in a highly uniform distribution.

In the filament so obtained, each polymer is finely dispersed and is in a lengthy continuation along the fiber axis. Therefore, the merits of each polymer are retained as they are. For instance, the filament has the Young's modulus intermediate of those of the polymers, and has less shrinkage, and moreover, the separation of polymers from each other in the filament occurs less frequently than simple sheath-and-core type or side-by-side type composite filaments. Thus, it is possible to remarkably enlarge the area where the polymers come into contact with one another.

In order to impart these properties completely, it is preferable that one spinning orifice on the spinneret should face at least 3 discharge orifices of the discharge device, and it is particularly preferable if the number of the discharge orifices is 10 or more. If the number of polymer streams discharged from the discharge orifices and to be associated is greater, the obtained filament is more homogeneous. The flexing stress is difficult to concentrate on a certain point, and is exerted uniformly throughout the filament. Such a filament exhibits a stable behaviour in the operation of drawing and winding up. Namely, if the number of the polymer streams is great, the associated streams behave as if they were a filament composed of one new polymer.

The filaments obtained by the use of a sheath-and-core type discharge device, side-by-side type discharge device and an independent type discharge device are the same in that each polymer is homogeneously dispersed, but are somewhat different in a tendency toward separation. The separation is most difficult with the filaments obtained by the sheath-and-core type discharge device. This is because in the sheath-and-core filament, there is a very high probability that polymer A as the core is completely dispersed by polymer B, and the polymer B is distributed around polymer A in roughly the same thickness.

In the above-mentioned embodiments, sheath-and-core type, side-by-side and independent type discharge devices are used individually, but it is possible to combine two or three of these types of discharge devices. Filaments having a more unique effect can be obtained depending upon the manner of arrangement of these devices.

Another embodiment of the apparatus of this invention for manufacturing the synthetic filament will be explained with reference to the drawing.

In FIGS. 8, 9, 10 and 11, a housing 201 is formed of a cylinder having top and bottom openings. To the bottom open end of the housing is fitted a spinneret plate 203 having discharge orifices 202 for a polymer stream wherein two polymers are highly dispersed. A dispersing means 206 is provided on the spinneret plate 203 so as to form a space 204 for assembling branched polymer streams between the inner wall 205 of the housing 201 and the spinneret plate 203. Further, a polymer feed part 210 consisting of three blocks 207, 208 and 209 is positioned on the said dispersing means 206. The said polymer feed part 210 is fastened from above by a fastener 211 by the action of a screw 212. Here the dispersing means 206 corresponds to the discharge device shown in FIGS. 5, 6 and 7, and the space 204 corresponds to the cell 110 of FIG. 5.

A polymer A feed hole 213 within the first block 207 communicates with a polymer A branching hole 215 provided in the second block 208 and the third block 209 which leads to the dispersing means 206 via a conical space 214 formed by the cavity perforated within the first block 207 and the second block 208. A polymer B feed hole 216 in the second block 208 of the polymer feed part 210 communicates with a polymer B branching hole 218 formed in the third block 209 which leads to the dispersing means 206 via a conical space 217 constructed by the cavity perforated within the second and third blocks 208 and 209. Further, the polymer A feed hole 213 and the polymer B feed hole 216 are respectively engaged with a polymer A flow inlet 219 and a polymer B flow inlet 220 perforated on the lateral walls of the housing 201.

The dispersing means 206 consists of many laminated dispersing plates 224. On every other space between the laminated dispersed plates, partition plates 226 and 227 are alternately inserted. On the dispersing plate 224, the polymer A passage 221 and the polymer B passage 222 are arranged alternately in a circuilar fashion, and the periphery has concavities and convexities 223. The partition plate 226 has the polymer A passage 221 and the polymer B passage 222, and the polymer A passage 221 has notches 225 which are open to the periphery of the plate. The partition plate 227 has the polymer A passage 221 and the polymer B passage 222, and the polymer B passage 222 has notches 225 which are open to the periphery of the plate.

On the upper surface of said laminated member is secured a fixed plate 228, and a fixed plate 230 equipped with a spacer 229 is held to the lower surface. A bolt 232 is inserted in a bolt hole 231 which is perforated through the centers of the said plates, and the laminated member is fastened tight by nuts from both the top and the bottom surfaces. Filtering members may be provided in the said conical spaces 214 and 217. The said polymer A branching hole 215 and the polymer B branching hole 218 are associated with the said polymer A feed hole 221 and the said polymer B feed hole 222, respectively.

The function of the apparatus shown in FIG. 8 will be explained below. Polymer A and polymer B are fed into the apparatus from the polymer A feed inlet 219 and the polymer B feed inlet 220 respectively. They respectively lead to the polymer A feed hole 213 and the polymer B feed hole 216, and thence to the conical spaces 214 and 217. In these spaces, the polymer stream is branched and via the polymer A branching hole 215 and the polymer B branching hole 218 respectively, reaches the dispersing means 206.

Through the dispersing means 206, the polymer A passage 221 and the polymer B passage 222 are perforated, and the polymers A and B are flowed into the said polymer passage 221 and 222, respectively. In the first partition plate 226 for the polymer A in the dispersing means 206, a part of the stream of polymer A flows out from the notch 225 of the polymer A passage 221 over the dispersing plate 224, and thence goes in the direction of the space 205. In the second partition plate 227 for the polymer B in the dispersing means 206, a part of the stream of polymer B flows out from the notch 225 of the polymer B passage 222 over the dispersing plate 224, and thence goes in the direction of the space 205.

Thus, polymers A and B streaming down the polymer passages 221 and 222 of the dispersing means 206 are alternately flowed from the notches 225 on the partition plates 226 and 227 onto each dispersing plate, and form dispersed stream sources. These dispersed stream sources of polymers are further dispersed by the action of concavities and convexities 223 on the periphery of the dispersing plates 224 and flow into the space 205.

By the way of setting the dispersing plates differently from each other at the placing of concavities and convexities, the streams of each polymer are associated while retaining their own streams as they flow down the space 205, and reach the upper surface of the spinneret plate 203. Namely, dispersed streams which are new streams formed as they flow down through the space 205 are discharged from each spinning orifice 202 and spun into filaments. Examining the structure of synthetic filament 1, one will find that polymers A and B are mutually dispersed, and are arranged in a long continuous fashion along the fiber axis.

In the above-explained embodiment, explanation has been made of the dispersing plate 224 having concavities and convexities 223, but the dispersing plate 224 may do without the concavities and convexities 223. In order to obtain preferable dispersed streams, it is better to have the concavities and convexities on the periphery of the dispersing plate 224. For better polymer dispersion, it is preferable that such a material as a net, porous material and a jaggy linear material be provided on the end of the space 205 or the distributing plate 224 to further divide, associate and re-divide the polymers flowing out along the dispersing plate.

Figure 12:
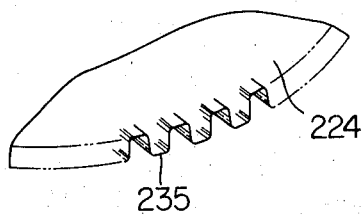
FIGS. 12 and 13 are perspective views in part showing other embodiments of the dispersing plate of the apparatus shown in FIG. 8.
Figure 14:
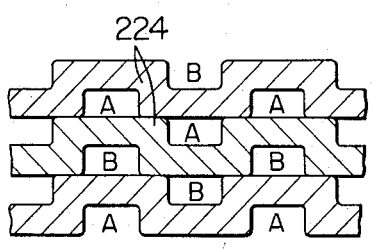
FIG. 14 shows the lamination of the dispersing plates of FIG. 12.

It is also effective to make the peripheral portion of the dispersing plate 224 wavy as shown in part in FIG. 12 by the reference numeral 235. A part of the side of the dispersing means constructed by laminating the dispersing plates and partition plates in the above-mentioned manner is shown in FIG. 14. Polymer A which flows from the end of the dispersing plate into the space 205 is associated with polymer B which flows from the end of the dispersing plate immediately thereunder into the space 205. Polymer A or polymer B is dispersed into polymer B or polymer A, and the so dispersed polymers flow down through the space 205.

Figure 13:
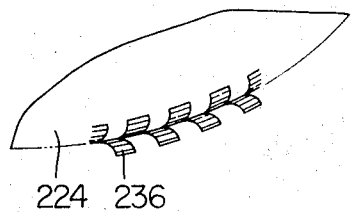

FIG. 13 shows a dispersing plate 224 whose periphery is of a bristle type wherein bristles are turned up and down alternately. This type of dispersing plate also performs dispersion effectively.

Figure 15:
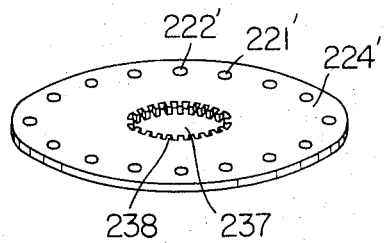
FIG. 15, 16 and 17 are perspective views showing the dispersing and partition plates used in another embodiment of the apparatus shown in FIG. 8.
Figure 16:
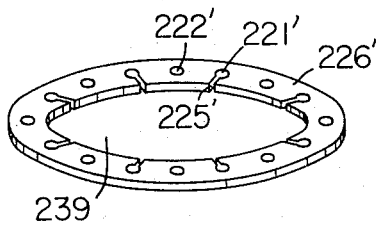
Figure 17:
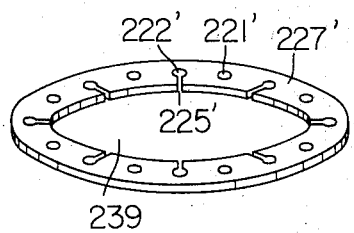
Figure 18:
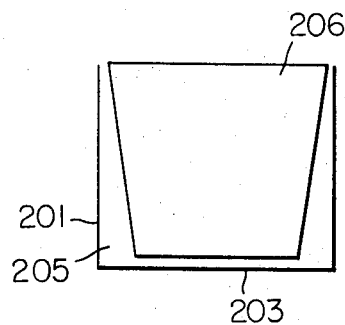
FIG. 18 is a schematic sectional view showing another embodiment of the apparatus shown in FIG. 8.

Now, another embodiment of the apparatus of this invention will be explained with special reference to its dispersing device. FIGS. 15, 16 and 17 show the dispersing plates and partition plates to be used in this embodiment. The great difference of this embodiment and the aforementioned embodiment is that a space to form dispersed streams is situated in the center of the apparatus. The dispersing plate 224' has polymer A passages 221' and polymer B passages 222' on the periphery, and a hole 237 to form a space in the center. Concavities and convexities 238 are formed on the inner periphery of the said hole 237. A partition plate 226' for polymer A as shown in FIG. 16 possesses polymer A and B passages 221' and 222', the passage 221' with notches 225' being opened into the hole 239 in the center. Further, the partition plate 227' for polymer B is provided with passages 221' and 222' for polymers A and B, the passages 222' with notches 225' being opened into the hole 239 in the center. These three kinds of plates are laminated in many layers in the order of dispersing plate 224', partition plate 226', dispersing plate 224' and partition plate 227' to form a dispersing means. The hole 237 has a diameter smaller than the hole 239, and they are arranged concentrically. The passages 221' and 222' are each aligned in a line. The function and advantages of this embodiment are the same as those of the previously explained embodiment.

Figure 8:
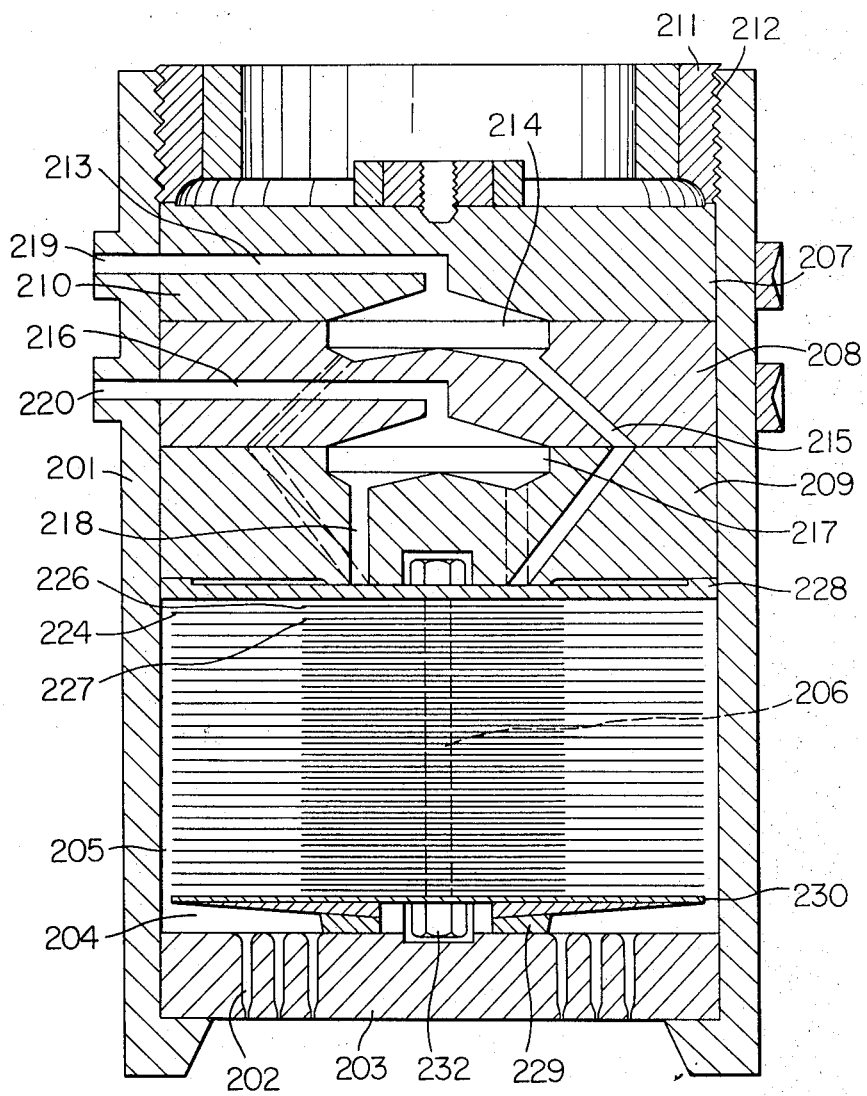
FIG. 8 is a longitudinal sectional view showing another embodiment of the apparatus of this invention for manufacturing the synthetic filament.
Figure 9:
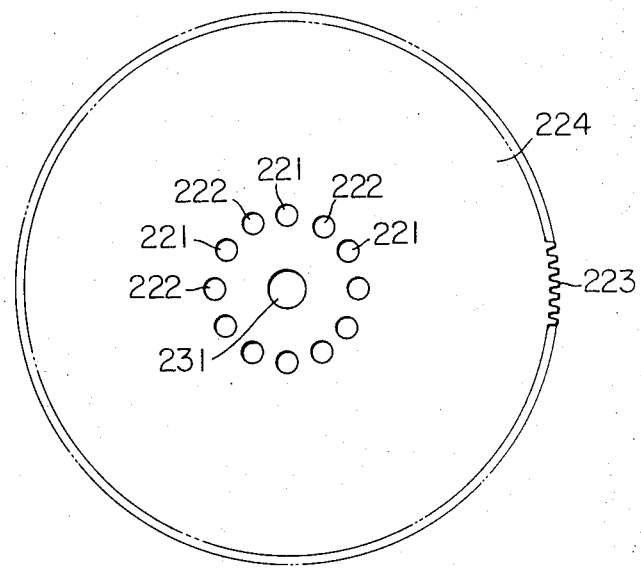
FIGS. 9, 10 and 11 are plan views showing a dispersing plate and partition plates of the apparatus shown in FIG. 8.
Figure 10:
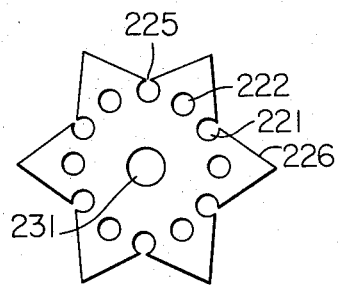
Figure 11:
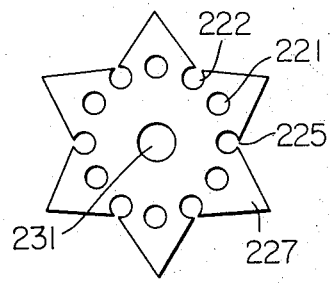
Figure 19:
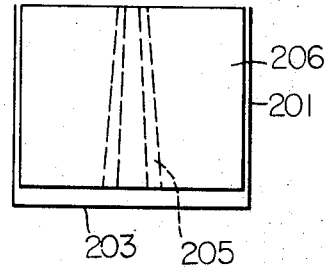
FIG. 19 is a schematic view showing another spinning apparatus wherein the dispersing plate and partition plates shown in FIGS. 15, 16 and 17 are used.

The shape of the space 205 formed between the dispersing means 206 and the housing 201 may be as shown in FIG. 8. It is also possible to change the shape of the dispersing plates so that the dispersing means 206 may be of inverse conical shape, and to form the space 205 which becomes progressively broader downwards. Or it is also permissible to form the space 205 by deforming the housing 201. Furthermore, as shown in FIG. 19, it is possible to form the space 205 in a conical form by using the dispersing plate 224' shown in FIG. 15 and laminating the dispersing plates 224' whose holes 237 are concentrically larger towards the bottom.

The number of dispersing plates to be laminated may be selected according to the desired object such as the degree of dispersing, but to elevate the operational efficiency, the number should preferably be increased within the range where no deviating stream occurs. For instance, the number may be 50 or 5,000.

The apparatus comprises a plurality of dispersing plates a space for collecting the polymers flowing from the said dispersing plates and a device for discharging the dispersed polymer streams flowing in the said space. By using this apparatus, therefore, at least two polymers, when made into filaments, are such that one polymer is dispersed in other polymer in the filament section, and it is possible to stably and efficiently produce filaments having a continuous structure along the fiber axis. In the foregoing, explanation has been made of the production of two polymers, but the production of synthetic filaments of this invention from three or more polymers can be easily achieved by the apparatus of this invention which is constructed as mentioned above.

Figure 20:
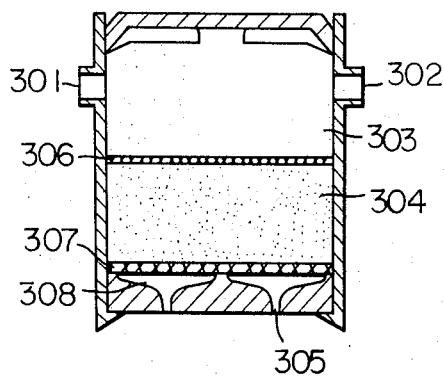
FIG. 20 is a longitudinal sectional view showing still another embodiment of the apparatus of this invention for manufacturing the synthetic filament.
Figure 21:
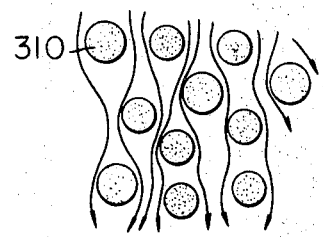
FIG. 21 is a view showing the state of the layer flow being dispersed and then associated.

Another embodiment of the apparatus shown in FIG. 20 is for the purpose of making the dispersion in layer stream more effective. To achieve this end, one or more sand layers, glass balls, metal net filters, porous plates and porous metals are arranged in layers, and polymers are passed through them. If necessity arises, the particle size and net mesh of these materials can be changed as desired. The thickness of the layers or the pressure to be exerted on the whole layers can be optionally adjusted. The streams of polymers A and B are independently guided into the upper part 303 of the discharge device through conduits 301 and 303, respectively. This part 303 will not be detailed here as it corresponds to the discharge device and dispersing means shown in FIGS. 5 and 8, respectively. Both polymers are associated and divided in the part 303 and turn into a layer stream where these polymers are laminated in the A, B, A, B – – – order. The layer stream is introduced into a dispersing portion 304 capable of dispersing the said layer stream. The dispersing portion 304 is a porous layer consisting of such materials as sand, glass ball, metal net, filter, porous plate and porous metal either alone or in combination, which have a predetermined size according to the thickness of the layer stream. Thus, the layer stream is divided and associated at random while flowing among particles 310, for instance, as shown in FIG. 21, the dispersion and mixing of a highly viscous stream takes place to a greater degree. Here the polymer stream, during flowing, is not cut off nor the mixing is done at random.

During or after the passage of the polymer streams through the dispersing part 304, each layer of the layer stream continuous in the widthwise direction is cut off at places, and other element is dispersed into the matrix element in the shape similar to that shown in FIG. 1. Each of the dispersed elements independently form an island A. This island A may sometimes be coalesced with an adjoining island. The polymer which forms each island is continuous along the longitudinal direction (see FIG. 3). The polymer streams dispersed in the sea-and-island form after passage of the dispersing portion 304 are passed through a lower part filter 307, associated in a cell 308, stabilized, and spun through a spinning orifice 305 while assembling the dispersed streams. The reference numeral 306 is a filter to support the sand 310 together with the filter 307.

The thus obtained filament has a cross section where islands composed of polymer A are dotted on the sea formed of polymer B. This filament 1, when drawn, can be of the size of about 1 denier. Therefore, a single filament of polymer A in the very fine part of filament 1 must be smaller in diameter. If polyethylene terephthalate and nylon 6 are respectively used as polymer A and polymer B, made into a composite filament in the manner explained above, and then put into formic acid, the nylon 6 is dissolved but the polyethylene terephthalate, which is insoluble in formic acid, remains as a plurality of monofilaments of 0.047 denier. Thus, according to this invention, a very fine synthetic monofilament can be obtained. This is surprising in view of the fact that continuous very fine filaments with less than 0.1 denier have not been able to be prepared in the past.

The filaments 1 as above mentioned are woven or knitted into fabrics or made into a web for use in non-woven fabrics. If such a fabric or web is subjected to a suitable solvent to dissolve polymer B, only polymer A insoluble in said solvent remains in the fabric or web. Thus, it has become possible to prepare a particular fabric formed of very fine denier filaments.

The following non-limitative examples are given to illustrate this invention.

Example I

In this example, polyethylene terephthalate and nylon 6 are used as the polymers to make up a very fine filament part.

The said polyethylene terephthalate has an intrinsic viscosity of 0.66 measured in ortho-chlorophenol at 25° C., and the nylon 6 has a relative viscosity of 2.35 measured at 25° C. with respect to a solution of 1% of the nylon in a 98% sulfuric acid. Both polymers have 0.5% of $TiO_2$ incorporated therein.

The apparatus used in one as shown in FIG. 5 which has the discharge device shown in FIG. 7. The diameter of the discharge orifices 108' and 108" is 0.2 mm., and there are provided 1000 such orifices. On the other hand, the diameter of the spinning orifice 109 in the spinning device is 0.3 mm. and there are provided 10 such orifices. The amounts of polyethylene terephthalate and nylon 6 discharged from the said discharge orifices are 11 g./min. and 25 g./min., respectively, and the temperature of these polymers is 285° C. The filaments spun from the spinning orifices are passed through a cooling chimney in the conventional manner. The air fed into the chimney is 22° C., and the speed of the air current through the chimney is 40 m./min. The filaments are then taken up at a rate of 1000 m./min. In the subsequent step, drawing is carried out with the use of a pin a hot plate. The pin has a diameter of 65 mm. and its surface is maintained at 90° C. The hot plate has a length of 20 cm. and its surface is maintained at 160° C. The filaments are drawn to 4.1 times the original length at a rate of 250 m./min. The drawn filaments are wound up with a winding tension of 0.29 g./denier.

The drawn yarn consists of 10 filaments each of which is of 8 denier. In one filament, 50 islands (A) formed of polyethylene terephthalate are uniformly dispersed in the sea (B) made of nylon 6, as shown in FIG. 1. These islands and sea are continuous in the longitudinal direction of the filament without interruption.

The so obtained filaments have a tenacity of 5.9 g./denier, an elongation of 30.2%, a Young's modulus of 45 g./denier, and a shrinkage in boiling water of 7.5%. Incidentally, nylon 6 singly has a Young's modulus of 30 g./denier, and polyethylene terephthalate singly 80 g./denier.

To confirm the denier of one island composed of polyethylene terephthalate, the said filament is immersed in formic acid and the nylon 6 portion is dissolved. Thus, a plurality of microfilaments consisting of polyethylene terephthalate are obtained. These monofilaments are of 0.058 denier, and have a tenacity of 5.6 g./denier and an elongation of 12%.

Example II

In this example, polyethylene terephthalate and nylon 6 are used as the polymers to compose a very fine filament part.

The said polyethylene terephthalate has an intrinsic viscosity of 0.74 measured in ortho-chlorophenol at 25° C., and the nylon 6 has a relative viscosity of 2.35 measured at 25° C. with respect to a solution of 1% of nylon in a 98% sulfuric acid. Both polymers have 0.5% $TiO_2$ incorporated therein.

The apparatus used is the type shown in FIG. 5 with the discharge device as shown in FIG. 6.

The diameter of the discharge orifice is 0.25 mm. and there are provided 790 such orifices. On the other hand, the spinning orifice 109 of the spinning device has a diameter of 0.3 mm. and there are provided 10 such orifices. The amounts of the polyethylene terephthalate and nylon 6 discharged from the said discharge orifices are 4.4 g./min. and 6.6 g./min., respectively. The polymer temperature is 290° C. for the polyethylene terephthalate and 280° C. for the nylon 6. The filaments spun from the spinning orifices are passed through a cooling chimney in the conventional manner. The air fed into the chimney has a temperature of 22° C., and the speed of the air flowing through the chimney is 35 m./min. The filament take-up speed is 1000 m./min. In the subsequent step, drawing is carried out with the use of a pin and a hot plate. The pin has a diameter of 35 mm. and its surface is maintained at 90° C. The hot plate is 20 cm. long, and maintained at its surface at a temperature of 160° C. The filaments are drawn to 3.4 times the original length at a rate of 300 m./min. The drawn filaments are wound up with a winding tension of 0.20 g./denier.

The drawn yarn consists of 10 filaments each of which is of 3 denier. In one filament, 79 islands (A) composed of polyethylene terephthalate are uniformly dispersed in the sea (B) formed of nylon 6, as shown in FIG. 1. The said islands and sea are continuous in the longitudinal direction without interruption.

To confirm the denier of one island of polyethylene terephthalate, the said filament is immersed in formic acid and the nylon 6 portion is dissolved and removed. Thus, 79 microfilaments of polyethylene terephthalate are obtained. These monofilaments are of 0.015 denier and has a tenacity of 5.8 g./denier.

Example III

In this example, polypropylene and polyethylene terephthalate are used as the polymers to make up a very fine filament part.

The said polypropylene has an intrinsic viscosity of 1.38 measured in tetralin at 135° C., and the polyethylene terephthalate has an intrinsic viscosity of 0.60 measured in ortho-chlorophenol at 25° C. Both polymers have 0.5% of $TiO_2$ incorporated therein.

The apparatus used is the type shown in FIG. 5. The discharge orifice has a diameter of 0.25 mm. and there are provided 500 such orifices. On the other hand, the diameter of the spinning orifice 109 in the spinning device is 0.3 mm. and there are provided 20 such orifices. The amounts of polypropylene and polyethylene terephthalate discharged from the said discharge orifices are 4.7 g./min. and 18.9 g./min., respectively. These polymers have a temperature of 290° C. The filaments spun from the spinning orifices are passed through a cooling chimney in the conventional manner. The air fed into the chimney has a temperature of 22° C., and the speed of the air flowing through the chimney is 30 m./min. The filament take-up speed is 800 m./min. In the subsequent step, drawing is carried out with the use of a pin and a hot plate. The pin has a diameter of 65 mm. and its surface is maintained at 95° C. The hot plate is 30 cm. long with its surface being maintained at 150° C. The filaments are drawn to 3.8 times the original length at a rate of 250 m./min. The drawn filaments are wound up with a winding tension of 0.2 g./denier.

The drawn yarn consists of 20 filaments each of which is of 3.5 denier. In one filament, 25 islands (A) of polypropylene are uniformly dispersed in the sea (B) formed of polyethylene terephthalate, as shown in FIG. 1. The said islands and sea are continuous in the longitudinal direction of the filament. The so obtained filament has a tenacity of 4.7 g./denier, an elongation of 32%, and a Young's modulus of 68 g./denier.

To confirm the denier of one island of polypropylene, the filament is treated with an aqueous alkali solution and the polyethylene terephthalate is dissolved and removed. Thus, there are obtained 500 multifilament of polypropylene with the monofilament being of 0.028 denier.

Example IV

Two polyethylene terephthalates having an intrinsic viscosity of 0.68 and 0.50 respectively measured in ortho-chlorophenol at 25° C. are used as the polymers to make up a very fine filament part. The former polyethylene terephthalate contains 0.05% of $TiO_2$ and 0.5% of carbon black, and the latter polyethylene terephthalate has a high brilliancy.

The apparatus used is the type shown in FIG. 5 with the discharge device shown in FIG. 7. The diameter of the discharge orifices 108′ and 108″ is 0.2 mm. and there are provided 1000 such orifices. On the other hand, the diameter of the spinning orifices 109 of the spinning device is 0.3 mm. and there are provided 16 such orifices. The amounts of the former polyethylene terephthalate and the latter polyethylene terephthalate discharged through the said discharge orifices are 7.0 g./min. and 10.6 g./min., respectively. The temperature of these polymers is 285° C. The filaments spun from the said spinning orifices are passed through a cooling chimney in the conventional manner. The air fed into the chimney has a temperature of 20° C., and its speed flowing through the chimney is 35 m./min. The filaments are taken up at a rate of 1000 m./min. In the subsequent step, drawing is carried out with the use of a pin and a hot plate. The pin has a diameter of 25 mm. and its surface is maintained at 90° C. The hot plate is 25 cm. long, and the surface temperature is held at 153° C. The filaments are drawn to 3.4 times the original length at a rate of 300 m./min. The drawn filaments are wound up.

The drawn yarn consists of 16 filaments each of which is 3.0 denier. The polyethylene terephthalate containing carbon black is uniformly dispersed in the polyethylene terephthalate having a brilliancy when the filament is viewed in its cross section. These polymers are in long and thin continuation in the longitudinal section. The filament is beautiful with deep black and brilliancy, and has a tenacity of 4.3 g./denier, an elongation of 34%, and a Young's modulus of 78 g./denier.

Example V

In this example, polyacrylonitrile (a copolymer of methyl acrylate with sodium acrylsulfonate) and cellulose acetate are used as the polymers to make up a very fine filament part.

The said polyacrylonitrile has an intrinsic viscosity of 1.45 measured at 25° C. in a 25% dimethyl sulfoxide, and the cellulose acetate has an intrinsic viscosity of 1.70 measured at 25° C. in a 25% dimethyl sulfoxide.

The apparatus used is the type shown in FIG. 5 with the discharge device as shown in FIG. 6. The discharge orifice has a diameter of 0.06 mm. and there are provided 2000 such orifices. On the other hand, the diameter of the spinning orifice 109 in the spinning device is 0.08 mm. and there are 40 such spinning orifices. The amounts of polyacrylonitrile and cellulose acetate discharged from the said discharged orifices are 1.6 g./min. and 0.4 g./ min., respectively. The temperature of these polymers is 25° C.

The spun filaments are passed through a first bath consisting of 50% of dimethyl sulfoxide and 50% of water and maintaining at 25° C. at a rate of 9 m./min., further passed through a second bath comprising 30% of dimethyl sulfoxide and maintained at 100° C. at a rate of 45 m./min., and still further passed through a third bath comprising 15% of dimethyl sulfoxide and maintained at 60° C. at a rate of 45 m./min. After wet heat treatment, the so treated filaments are dried.

The thus obtained filaments consists of 40 monofilaments each of which is of 2.5 denier, and have a unique feeling.

What is claimed is:
1. A synthetic filament comprising two polymer elements having different compositions, characterized in that one of the polymer elements is distributed as islands in the sea of the other polymer element when seen in cross section of said filament, the number of the islands being at least 3, the polymer element of each of said islands repectively forming a fine filament part which is continuous along the axis of said filament.
2. The filament of claim 1 wherein said islands are distributed separately from one another in the continuous phase of the sea.
3. The filament of claim 1 wherein each of said islands is connected with at least one other island.
4. The filament of claim 1 wherein each of said islands is of less than 0.1 denier in a drawn state.
5. The filament of claim 1 wherein the island component is composed of a polyester and the sea component is composed of a polyamide.
6. A method for the production of the filament of claim 1 which comprises discharging two polymer elements having different compositions as separate streams continuous in the longitudinal direction to form at least 3 composite streams made up of the two separate polymer streams in direct contact, assembling the composite streams to form a continuous assembly with the composite streams in close contact with one another without gap, and spinning the assembly from a spinning orifice.
7. The method of claim 6 wherein each of said composite streams is composed of a sheath of one polymer element and a core of the other polymer element.
8. The method of claim 6 wherein each of said composite streams is composed of said two separate polymer elements arranged in a side-by-side relationship.
9. An apparatus for the production of the filament of claim 1 comprising at least 3 discharging devices each for discharging two separate polymer streams having different compositions, a space communicating with the said discharge devices and adapted to receive the polymer streams flowing from the said discharge devices in a layer stream, and a spinning orifice communicating at one end with the said space and having at the other end a spinneret plate provided with spinning orifices.
10. The apparatus of claim 9 wherein the discharge device is composed of a sandwich-type lamination of a plurality of dispersing plates and partition plates, said dispersing plates each having a dividing means for a polymer stream on its outer periphery or on the periphery of its inner opening.
11. The synthetic filament of claim 1 wherein the number of islands is not less than 10.

References Cited

UNITED STATES PATENTS

| | | | |
|---|---|---|---|
| 2,955,961 | 10/1960 | Koller | 117—138.8 |
| 3,369,057 | 2/1968 | Twilley | 156—110 XR |
| 3,099,067 | 7/1963 | Merriam et al. | 161—406 |
| 3,117,906 | 1/1964 | Tanner | 161—406 |
| 3,295,552 | 1/1967 | Powell et al. | 264—171 |
| 3,330,899 | 7/1967 | Fukushima et al. | 264—210 |
| 3,382,305 | 5/1968 | Breen | 264—171 |

DONALD E. WATKINS, Primary Examiner

U.S. Cl. X.R.

18—8; 57—140, 153; 117—138.8; 161—177; 264—171

Disclaimer

3,531,368.—*Miyoshi Okamoto*, Ohtsu-shi, *Koji Watanabe*, Sonoyama, *Yasuhiko Nukushina*, Kyoto, and *Tsuneo Azawa*, Ohtsu-shi, Japan. SYNTHETIC FILAMENTS AND THE LIKE. Patent dated Sept. 29, 1970. Disclaimer filed June 20, 1977, by the assignee, *Toray Industries, Inc.*

Hereby enters this disclaimer to claims 1 and 2 of said patent.

[*Official Gazette August 23, 1977.*]